Patented May 30, 1939

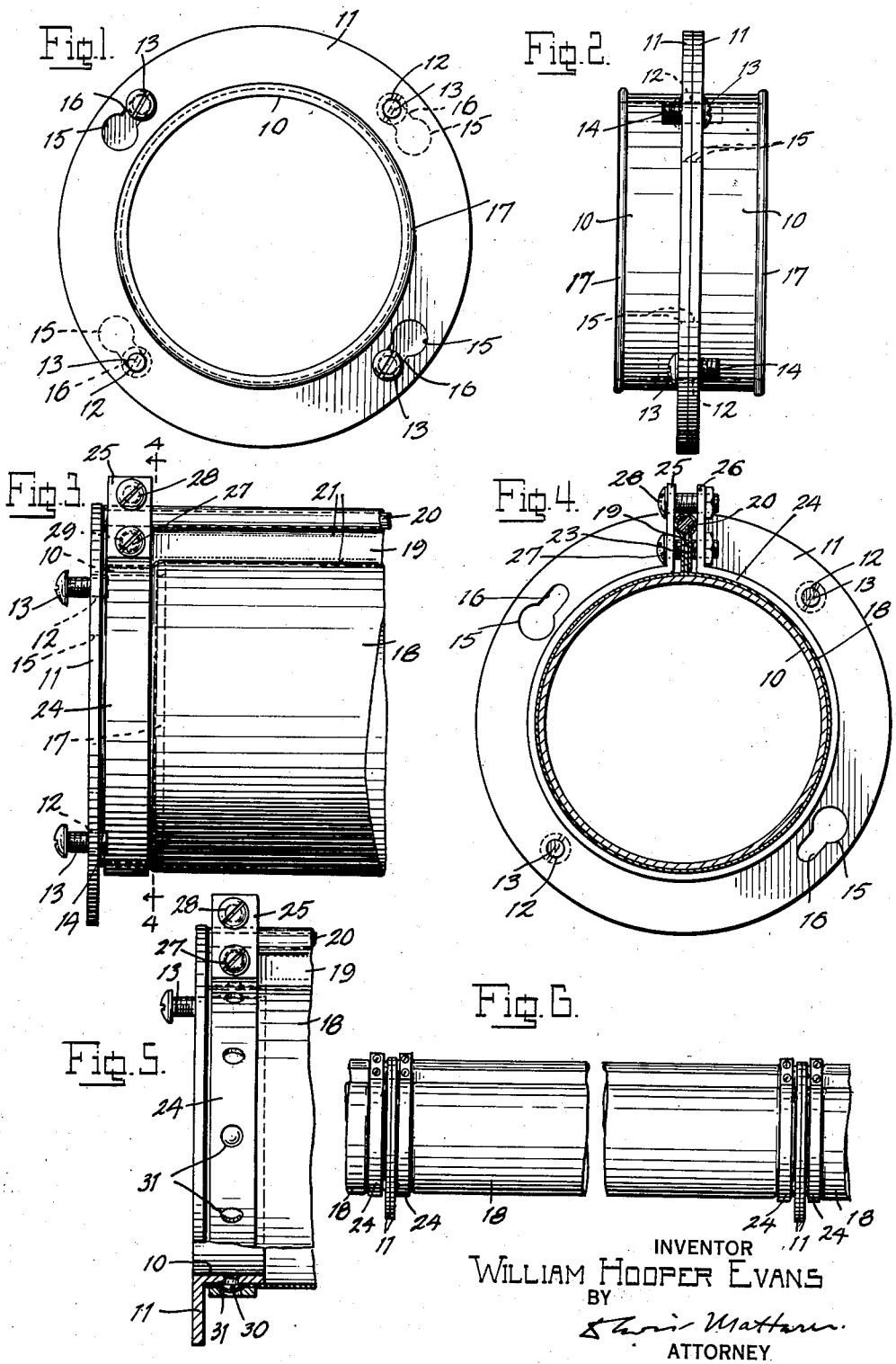

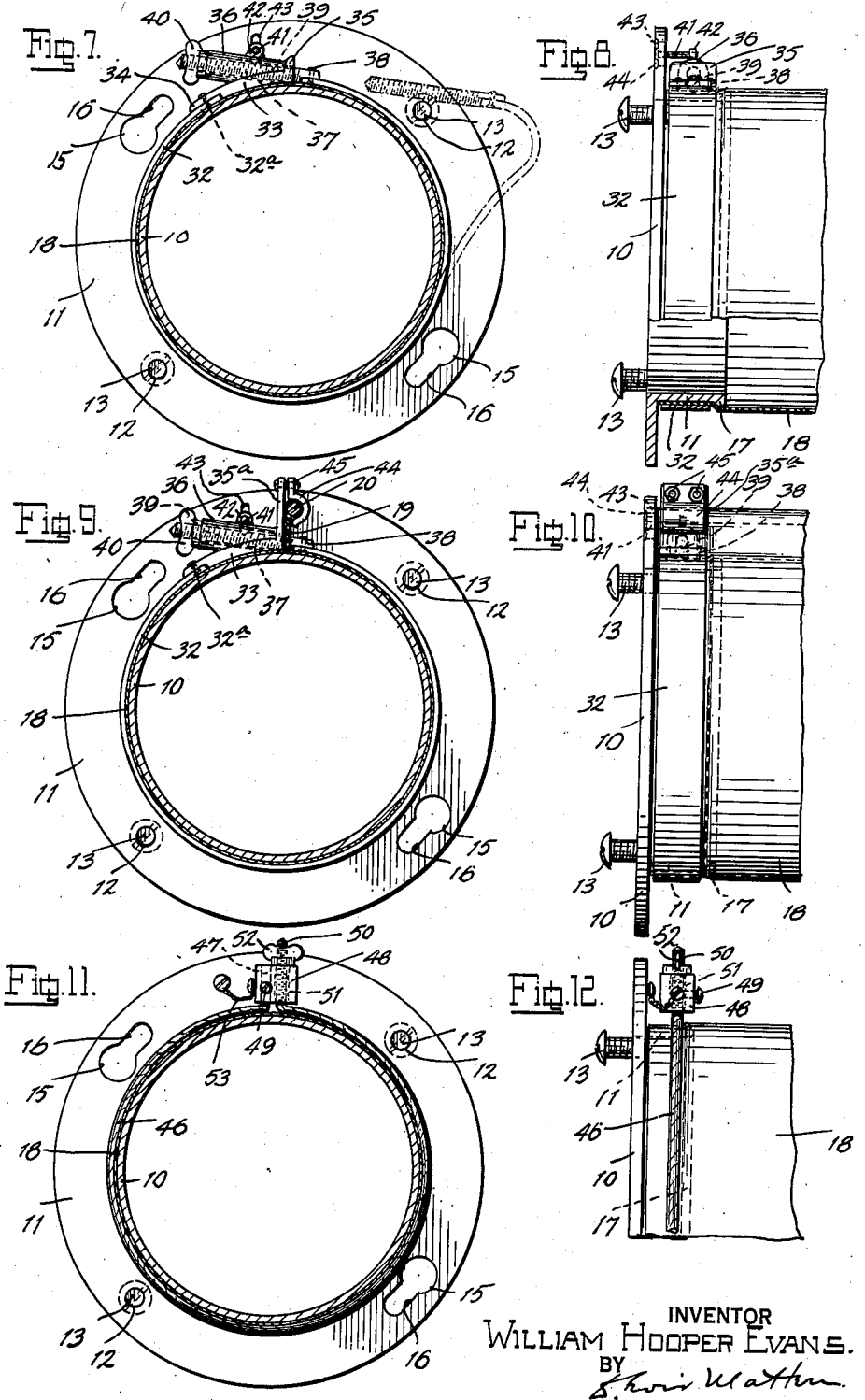

2,160,354

UNITED STATES PATENT OFFICE 2,160,354

COUPLING FOR FABRIC HOSE

William Hooper Evans, University City, Mo.

Application December 28, 1936, Serial No. 117,960

3 Claims. (Cl. 285—67)

The present invention relates to tubing for fabric hose, particularly flexible collapsible hose of the type used in mines for conducting air for ventilation purposes. Hose of this type comes in sections of varying lengths, which sections are coupled together in the mine, and the coupling means heretofore in use have for the most part been of two types, one a sewed-in coupling, and the other a detachable coupling, that is detached from the tubing when not functioning as a coupling between two sections. Both of these types have their advantages and disadvantages, and it is an object of the present invention to provide an improved coupling in which the advantages of both types are realized, and which does not have the disadvantages.

The sewed-in type of coupling is usually sewed in to the hose or tubing at the factory, and has the advantage that it is permanently fixed in the end of the tubing so that it will not become displaced or lost. It makes each section of the coupling a complete unit, but has the disadvantage of not being able to be repaired or replaced in the mine when it or the tubing becomes damaged. Also the tubing with the sewed-in coupling must be furnished in standard lengths, of say 25, 50 or 100 feet, and thus cannot be accurately fitted to the mine passages, making it awkward to install and inconvenient for the connection of accessories, such as blowers or the like, at uneven distances. Another advantage of the sewed-in type of coupling is that longitudinal strain upon the tubing will not separate it from the coupling. A number of these sewed-in types of couplings are disclosed for instance in the following United States patents. Braly 1,228,397, Nettleton 1,274,438, Teed 1,291,251, Braly 1,310,559, Evans 1,525,538, Braly 1,861,296 and Brown 2,003,918.

The detachable type of tubing has the advantage of being attached by workers in the mine to any desirable length of tubing, so that the mine operators may more economically purchase the tubing in long lengths and cut it to fit the work. Also if a section is to be repaired or replaced, or the coupling crushed, it is only necessary to attach another coupling which may be easily done without appreciably holding up the operation of the mine. However, detachable couplings have the disadvantage that the parts may become lost, and also due to their construction become bent out of shape, due to the necessity of removing the parts of coupling from the tubing in connecting the sections of tubing together. Couplings of the detachable type are shown for instance in the patents to Bins 1,440,814 and 2,003,732.

In serving the mining fields of the world a flexible tubing and its coupling must operate successfully where mining methods and conditions vary greatly, especially in regards to ventilation. To cope with all situations that arise the tubing coupling must be simple in design, rugged in construction, positive in its coupling and uncoupling action, be reversible, be easy to install and repair underground, and its operation understood and capable of being carried out by any class of labor. It should function as an integral part of the tubing, or act as an individual and separate coupling element to join two sections of tubing. It is the purpose of my invention to provide a coupling in which all of these novel features are combined, thereby giving it manifest advantages over other types of couplings now available.

An object of my invention, as shown in the exemplary illustrated embodiment, is to provide a simple coupling by bringing two flat circular surfaces in contact with each other and by securing them together with a screwing or clamping action, and further, to attach the tubing to the flanges of the collars with means held together with a clamping or screwing action. Thus two flat surfaces meet when the collars join and two cylindrical surfaces meet when the tubing is secured to the flange.

I propose to show that collars and tubing joined in this manner have a positve coupling and uncoupling action. For this purpose screws or bolts and key slots are employed. The positions of these in each collar are identical so that when the two collars are brought into position for securing fast, by tightening the screws. Thus the coupling of the two collars is positive screw action. To uncouple, the screws are loosened—again positive action. There is no opportunity for the coupling to stick together and require considerable force to uncouple as no spring or wedging action is used as with other couplings whose elements slide into position.

It is further proposed to show that in a joining of the above character the tubing when attached to the flange in its natural cylindrical shape does not sacrifice even an inch of material for the joining, and avoids the necessity of flattening the seam to make the tubing fit the flange.

It is also proposed to show that in joining the tubing to the flange with positive clamping action it is not cuffed, wrapped around a coupling element, or distorted or stretched in any manner.

Such a procedure has a tendency to make the material bulk around the coupling element and cause air leaks and pockets, and also causes the tubing to shear when the element with the material around it is passed thru another coupling element. In my invention I propose to arrange the seam part of the tubing, so that it fits into the space between the ends of the clamping means, so as not to interfere with the joining action of the tubing to the flange. This overcomes defects found in other couplings, wherein the material sticks out from the coupling.

Another object of my invention is to provide a coupling for the joining of two sections of tubing where it is not necessary to pull the slack out of a line of tubing in order to couple or uncouple the tubing. A distinct disadvantage in the use of some types of couplings is the necessity of placing the coupling element in one end of the tubing section at right angles or at a sharp angle to the coupling element in the section to be joined, before a joining of two sections of tubing can be made. Attempting to pull enough slack for this purpose in a line of tubing in use, which sometimes necessitates the removal of the tubing, temporarily at least, from the suspension wire so that the miner can get at it, is not an easy task.

It is proposed in my invention to show that through the use of collars with flat engaging surfaces, held together by screw action, not more than half an inch slack is needed for the coupling or uncoupling of two sections in a line of tubing in use. To couple it is merely necessary to bring the two collars so they butt against each other with their bolt heads fitting through the key slots as previously described. Next the collars are rotated slightly and the bolts tightened. To uncouple it is merely necessary to reverse the process.

Also to take the coupling entirely out of the tubing it is only necessary to unloosen the clamping means by unscrewing the bolts and again no slack in the tubing is needed for this operation. Thus it is shown that there is neither any need of placing any parts at right angles to each other, or of pulling slack in the tubing. Such bothersome operations as pulling slack, has interfered with the use of flexible tubing and has caused some miners to dislike its use.

Another object of my invention is to provide an extremely rugged, rigid coupling which will effectively withstand the roughest mine usage. I propose to show by its design that its parts can be made as strong as desired without in the least interfering with its action or efficiency. The cross-section of each collar, according to the exemplary illustrated embodiment of the invention, is L-shaped although it may be of square or other suitable cross-section. And, since the front side is the contacting side or surface, the width of the metal in the collar can be made as wide as necessary. Also, since the tubing fits over the flange of the coupling, without folding or cuffing the material the width of this band and its thickness, as well as the diameter of the screw bolts, can be increased without interfering with the coupling action. In this manner the present coupling permits the addition of strength to the coupling collars until they can more than withstand any strains or blows encountered in mining practice.

I further propose to show that my invention is in sharp contrast with other types of couplings which depend on spring or friction action of contracting or expanding bands or expanding rings, which are placed in or passed thru each other, and whose coupling elements must remain flexible or resilient in order to function properly, and whose design does not permit the addition of strength to the elements, without destroying their efficiency. In some couplings of this type, sizes as small as 8 inches in diameter do not couple easily. With my invention, which does not depend on spring action, but uses solid collars with their cooperating clamping means, collars as small as one inch in diameter will work just as satisfactorily as larger sizes. It is this employment of rigid, solid collars that gives my coupling its adaptability and strength.

Another object of my invention is to provide a coupling which may be repaired underground without the aid of machines or special tools. The L-shaped collars have sufficient strength to withstand all ordinary shocks, but in the event they become damaged and out of shape they may be hammered back into sufficiently proper shape in order that the bolts may hold enough to secure the faces together. In the event the bolts are bent too, the collars may be held together with wire. The same applies to attaching the tubing to the flange. If the bands are damaged beyond repair the tubing can be tied to the flange. Thus a line of tubing can be kept in shape to pass the air thru until a new coupling can be substituted. Then again the coupling element can be removed entirely at will from the tubing and put back without the use of a sewing machine, as will presently be more fully referred to.

Another object of my invention is to provide a coupling with two collar elements which join to each other, and each having its individual clamping means to clamp the tubing to its respective collar. It is proposed to show that a coupling of this character serves a dual purpose.

First, by the use of one collar and its clamping means, which is attached in each end of the tubing, I show that a section of tubing possesses coupling elements in each end, ready for joining, and thus each section has its coupling elements as integral parts of the tubing. These coupling elements may be clamped in at the factory or the mine shop, either method permitting each section to be sent underground complete. This construction offers decided advantages to the user, and is in demand for certain classes of mining where the tubing is installed in straight runs and where it is not taken down or removed for some time. Thus a tubing section that has few parts to lose proves the best for certain underground work. Tubing couplings of this type have to date had the disadvantage of having their coupling elements sewed in at the factory with a special machine, therefore having the obvious disadvantage of being incapable of being repaired or replaced underground without removing the entire section.

Second, by the use of the two collars clamped together and the tubing attached to them underground with the clamping bands, the coupling acts as an independent element thus affording the manifest advantage of being placed in or removed at will underground.

Again this type of coupling meets the requirements for certain classes of mining. In large mines where the tubing lines are split into several branches, where the tubing is carried around bends in crooked drifts, or up raises or down winzes, or into stopes, the tubing must be tailored to fit the job. Obviously the coupling must be put in the tubing at each desired point. In the larger mines that have a heat condition to contend with which requires mechanical ventilation of all working places, a coupling of this type is imperative for successful operation of the tubing.

I propose to show that in my invention the advantages of all types of couplings are obtained for the first time in a single structure. This coupling will perform in any way that other couplings will, and further, only one type of coupling is needed, whereas, with the other types two kinds of couplings are needed to satisfactorily serve under all mining conditions. Again, obviously a mine operator does not care to stock two kinds of couplings to do the work that one will do.

A still further object of my invention is to show an improvement in the joining of the reinforcement rope sewed in the seam and joined independently of the coupling with separate snap hooks, as disclosed in my Patent No. 1,596,418, by utilization of the clamping means that clamp the tubing to also securely clamp and hold the rope. The tubing rope is sewed in the seam and is usually extended to receive the snap hooks for joining. With my present invention the rope is left in the seam and continues flush to the end of the tubing.

The metal means which clamps the tubing to the flange has two bolts, and a hole is punched through the seam of the tubing just below the rope but above the threads that set it. The lower bolt of the clamp passing through the hole in the seam, and the top bolt passing above the seam. When both bolts are screwed tight, the rope in the seam as well as the tubing is substantially secured to the flange on the collar. The necessity of the snap hooks is done away with.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a front elevation of the two coupling members secured together without the tubing attached thereto.

Fig. 2 is a side elevation.

Fig. 3 shows a coupling member secured to one end of a section of tubing.

Fig. 4 is a vertical sectional view taken along the line 4—4 of Fig. 3.

Fig. 5 is a side elevation of a modified form of coupling, a portion coupling and tubing being shown in vertical section.

Fig. 6 is a reduced side elevation showing a section of tubing, partially broken away, coupled to the ends of adjacent sections.

Fig. 7 is a sectional view similar to Fig. 4 but showing a modified form of clamping means.

Fig. 8 is a side elevation thereof, partially in section.

Fig. 9 is a view similar to Fig. 7 showing another modified form of clamping means.

Fig. 10 is a side elevation thereof.

Fig. 11 is a view similar to Fig. 7 showing still another form of clamping means.

Fig. 12 is a frictional side elevation thereof.

Similar reference characters indicate corresponding parts throughout the several figures of the drawings.

Referring to the drawings, the coupling proper consists of two identical members adapted to be secured together by securing means carried permanently upon these members, each member consisting of a cylindrical collar portion 10 and a flange portion 11, the cross-section being of L-shape. The flange portion 11 of each of the members is provided at two diametrically opposed points with threaded holes 12 in which are engaged headed screws 13, the end convolutions of the thread being burred, as at 14, so that the screws cannot be detached. At points midway between the holes 12 there are provided diametrically opposed key slots each having a portion 15 large enough to receive the head of the screw 13 and a reduced portion 16 for receiving the shank of the screw. In securing the two members of the coupling together it will be seen that the loosened screws of one member will engage the key slots of the other, whereupon the members are turned relatively to each other to bring the shanks of the screws into the reduced portions 16 of the slots, the screws then being tightened so that one flange 11 is tightly secured to the other flange 11. The engagement between the couplings thus produced is sufficiently air-tight under ordinary pressures, but where greater air-tightness is desired this may be accomplished by inserting a compressible washer between the flanges 11—11. The collar portion 12 of each coupling member is provided upon its end with an outwardly projecting annular rib 17 for co-operation with the clamping band for securing the tubing, as will presently more fully appear.

The tubing 18 formed of flexible fabric, such as canvas or the like, is provided with a flanged seam consisting of a marginal portion 19 carried about a longitudinally extending rope 20, and stitched by double rows of stitching 21—21 to a marginal portion 23 of the fabric interposed between the folded over portion 19. In tubing as heretofore employed with other types of couplings this seam flange with its rope was usually finished off in spaced relation to the ends of the tubing, so that the tubing could be connected to the coupling, the seam flange of one section being connected to the seam flange of the adjacent section by means of snap-hook, or the like. According to the present invention the seam flanges may extend to the end of the tubing due to the novel arrangement of the clamping means employed.

The end of the tubing is engaged over the collar 19 and is then secured in place by means of a clamping band 24 having its ends 25 and 26 bent outwardly in spaced-parallel relation, so that these ends are disposed at each side of the roped seam flange. Bolts 27 and 28 are engaged through the ends 25 and 26, which upon tightening snugly clamp the end of the tubing about the collar, and also securely clamp the end of the roped seam snugly against the flange 11. In order to connect the bolt 27 the roped seam flange is provided with a hole 29 through which the bolt 27 is engaged beneath the rope 29, the bolt 28 being disposed above the rope. The band 24 tightly clamps the end of the tubing about the collar and being adjacent the projecting rib 17 securely retains it by a snubbing action against pulling out through longitudinal strain upon the tubing.

It will be understood that coupling units are secured to the ends of each tubing section, as shown for instance in Fig. 6, and may be connected to coupling units at the respective ends of the adjacent sections simply by inserting the loosened screws 12 of one coupling member into the key slots of the other coupling member and then slightly rotating the coupling member, whereupon the coupling members are secured by tightening the screws. Obviously the tubing may be cut to any desired length in the mine and the coupling units conveniently secured in place by the workmen in the mine. When once secured there are no detachable parts to become lost or damaged, so that while the tubing has all of the advantages of the sewed-in type of tubing, as well as of the detachable type of coupling, it has none of the disadvantages of these types.

In Fig. 5 I have shown a modification in which the rib 17 is dispensed with, and in its place the collar 10 is provided with a series of rivet heads 30 which register with holes 31 provided in the band 24, the material of the tubing 18 being secured against longitudinal displacement by being interlockingly pressed into the holes 31 by rivet heads 30.

Instead of making the coupling units of L-shape in cross-section it will be understood that they may be made of other shapes in order to perform the functions contemplated by the invention, as long as a flat surface is provided for abutting the coupling units together and a surface is provided about which the end of the tubing may be clamped. Thus for instance the cross-section of the coupling member may be rectangular, presenting a flat ring surface for engagement with the other coupling member and a cylindrical surface for clamping of the end of the tubing.

In Figs. 7 and 8 I have illustrated a modified form of clamping means for use with the coupling member instead of the clamping band, as shown in Figs. 3 to 6, and which consists of a flat flexible band 32, preferably of woven cable or the like to one end of which there is secured by means of rivets 32ᵃ a clamping element, preferably formed of cast metal, and consisting of a base 33 shaped to conform to the cylindrical shape of the coupling member and having an extended tongue 34 to which the end of the band is riveted. It is provided at its forward end with a flat face 35 from which tubular portion 36 projects rearwardly, and which is provided with a passage 37 disposed along a substantially tangential line of the member when the clamping member is in position.

To the other end of the band there is secured by rivets 38 a screw 39 adapted to be slidably engaged through the passage 37 and adjustably secured in the clamping member by a wing nut 40 bearing upon the end of the tubular portion 36. The end of the tubing 18 is placed upon the collar portion 11 of the coupling and the band is then clamped about the tubing between the flange 11 and the rib 17.

In order to prevent the clamping means from becoming separated from the coupling the same is secured thereto by means of a screw 41 engaged in an ear 42 of the clamping member and slidably engaged in a slot 43 of the flange 11, this slot being countersunk, as at 44, to receive the head of the screw, so that it does not project from the surface of the flange. This arrangement secures the clamping means to the coupling, but permits it to be moved for the purpose of conveniently engaging the tube about the collar 10.

The screw 29 is tangential to the collar 10 in the clamped relation, so that the band, the base of the clamping member, and the screw constitute a complete and continuous circle about the tubing, and thus no pocket is left through which air can escape. There is preferably considerable clearance between the passage 37 and the screw 39 so that the screw will be drawn into the surface of the tubing as it is tightened, irrespective of slight variations in the thickness of the tubing.

In Figs. 9 and 10 I have illustrated a further modification for use with tubing provided with a flange seam portion 19 having a rope 20, as shown in Figs. 3 to 6. In this case the clamping member is provided with a flat face 35ᵃ against which the flange 19 engages and which is extended beyond the edge of the flange. A hook shaped clamp 44 is engaged about the roped edge of the flange and its base is secured to the portion 35ᵃ by bolts 45.

In Figs. 11 and 12 I have shown a further modification of clamping means which consists of a round wire or cable 46, adapted to be engaged about the collar of the coupling, one end of this cable being secured in a hole 47 of a block 48 by a set-screw 49. To the other end of the clamp there is secured a screw 50 which may be welded, swedged, or otherwise suitably connected thereto and which screw is engaged through a passage 51 in the block 48, being secured by a winged nut 52 engaged upon its end and bearing upon the upper side of the block. In order to secure the clamping means against loss it is connected to the coupling member by means of a chain 53.

The clamping means is connected to the coupling by first engaging the end of the tubing over the collar and then carrying the coupling about the tubing and inserting the screw 50 through the block, whereupon tightening of the wing-nut contracts the cable and secures the tube in place. Should there be any slack in the cable, this can be taken up by pulling the end of the cable through the passage 47 to a greater or less extent, and securing it by the set screw 39.

I have illustrated and described preferred and satisfactory embodiments of the invention, but it will be obvious that changes may be made therein within the spirit and scope thereof, as defined in the appended claims.

Having thus described my invention what I claim and desire to secure by Letters Patent is:

1. A coupling member for connection of an end of a section of flexible tubing, and adapted for securing to a similar coupling member attached to the end of an adjacent section of tubing, comprising a collar portion, means carried by said collar portion adapted to abut and be secured to said similar coupling member, said collar portion adapted to be engaged in the end of the flexible tubing, a clamping band disposed about said collar and adapted to secure said tubing to said collar and having apertures and projecting beads on said collar adapted to engage said apertures of said band to secure said tubing against longitudinal movement.

2. A coupling member for connection of an end of a section flexible tubing having a roped seam flange, and adapted for securing to a similar coupling member attached to the end of an adjacent section of tubing, comprising a collar portion, means carried by said collar portion adapted to abut and be secured to the flange portion of said similar coupling member, said collar portion adapted to be engaged in the end of the flexible tubing, clamping means disposed about said collar and adapted to secure said tubing to said collar, and means carried by said clamping means adapted to clampingly engage said roped seam flange.

3. A coupling, comprising a coupling member for connection of an end of a section of flexible tubing, an identical coupling member for connection of an end of another section of flexible tubing, each of said coupling members having identically placed bayonet slots and flat parallel inner and outer surfaces surrounding said slots, and headed screw means on each of said coupling members identically placed and adapted to engage said bayonet slots of the other coupling member, whereby said coupling members are adapted to be connected by relative rotary movement, the shanks of said screw means adapted to loosely engage said slots in any position of relative rotation and said coupling members adapted to be secured against relative rotation by tightening down the heads of said screw means against said flat parallel outer surfaces surrounding said bayonet slots.

WILLIAM HOOPER EVANS.